United States Patent
Dittmar et al.

(10) Patent No.: US 10,414,912 B2
(45) Date of Patent: Sep. 17, 2019

(54) METAL COMPOSITE CORE COMPOSITION PANELS AND PROCESS FOR MAKING SAME

(71) Applicant: J.M. HUBER CORPORATION, Atlanta, GA (US)

(72) Inventors: Thomas Dittmar, Cologne (DE); Joachim Schaeling, Siegburg (DE); Martijn Mies, PJ Eindhoven (NL); Bashar Diar Bakerly, Cologne (DE)

(73) Assignee: J.M. Huber Corporation, Atlanta, GA (US)

( * ) Notice: Subject to any disclaimer, the term of this patent is extended or adjusted under 35 U.S.C. 154(b) by 85 days.

(21) Appl. No.: 15/528,916

(22) PCT Filed: Nov. 6, 2015

(86) PCT No.: PCT/US2015/059388
§ 371 (c)(1),
(2) Date: May 23, 2017

(87) PCT Pub. No.: WO2016/089543
PCT Pub. Date: Jun. 9, 2016

(65) Prior Publication Data
US 2017/0298213 A1 Oct. 19, 2017

Related U.S. Application Data

(60) Provisional application No. 62/086,877, filed on Dec. 3, 2014.

(51) Int. Cl.
| | |
|---|---|
| C08L 23/08 | (2006.01) |
| C08K 3/22 | (2006.01) |
| C22C 21/00 | (2006.01) |
| C08K 5/098 | (2006.01) |

(52) U.S. Cl.
CPC ............ *C08L 23/0853* (2013.01); *C08K 3/22* (2013.01); *C22C 21/00* (2013.01); *C08K 5/098* (2013.01); *C08K 2003/2227* (2013.01); *C08L 2666/30* (2013.01)

(58) Field of Classification Search
CPC .............................................. C08K 2003/2227
See application file for complete search history.

(56) References Cited

U.S. PATENT DOCUMENTS

| | | | |
|---|---|---|---|
| 5,962,129 A | 10/1999 | Halloran et al. | |
| 7,959,895 B2 * | 6/2011 | Herbiet | C01F 7/021 423/600 |

FOREIGN PATENT DOCUMENTS

| | | | |
|---|---|---|---|
| CN | 102241835 A | * | 11/2011 |
| EP | 2420380 A1 | | 2/2012 |
| GB | 2083480 A | | 3/1982 |
| GB | 2119387 A | | 11/1983 |

OTHER PUBLICATIONS

Machine translation of CN-102241835-A. (Year: 2011).*
International Search Report and Written Opinion from corresponding International Patent Application No. PCT/US2015/059388, dated Feb. 8, 2016.

* cited by examiner

*Primary Examiner* — Wenwen Cai
(74) *Attorney, Agent, or Firm* — Merchant & Gould P.C.

(57) ABSTRACT

This invention relates to metal composite panels and to a core composition, or core filler composition, used for making them. This invention also relates to a process for making the metal composite panels by extruding the core composition or core filler composition between two metal panels and calendaring the metal panels to form the metal composite panels.

13 Claims, 1 Drawing Sheet

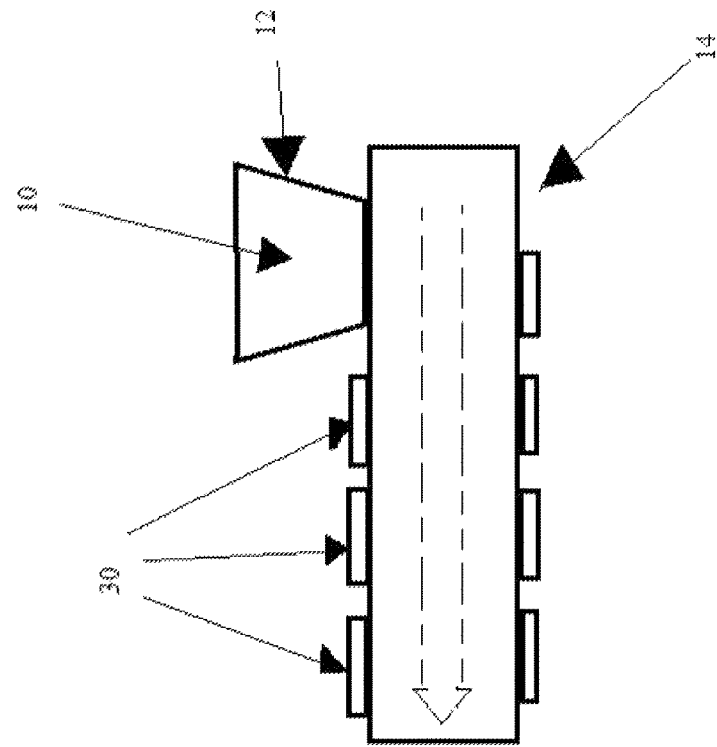
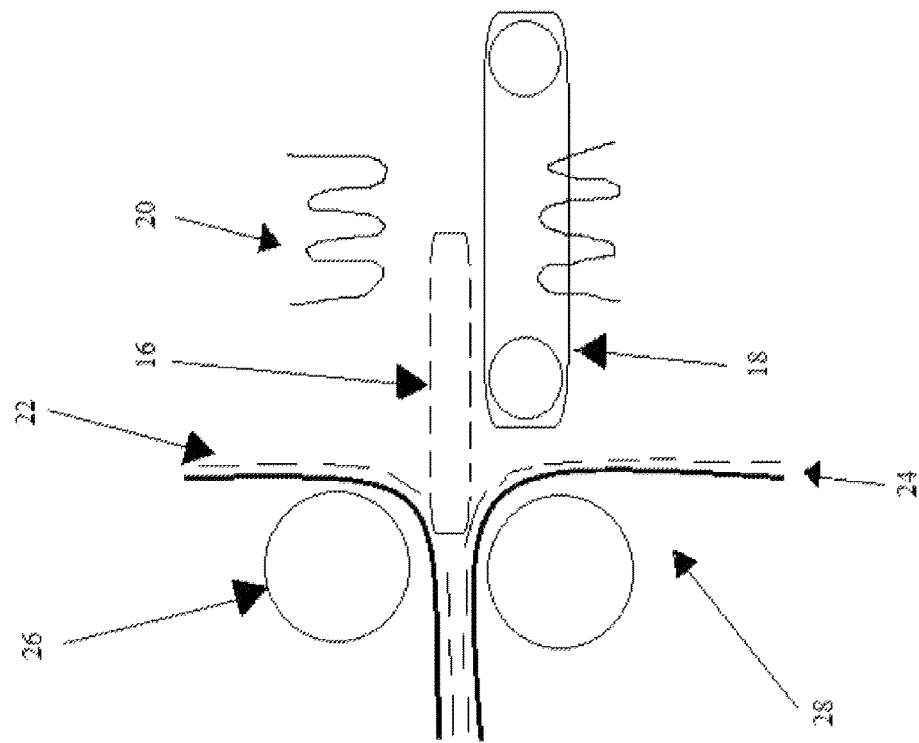

METAL COMPOSITE CORE COMPOSITION PANELS AND PROCESS FOR MAKING SAME

REFERENCE TO RELATED APPLICATIONS

This application is a National Stage Application of International Patent Application No. PCT/US2015/059388, filed 6 Nov. 2015, which claims the benefit of U.S. Provisional Application No. 62/086,877, filed 3 Dec. 2014, the disclosures of which are incorporated herein by reference in their entirety. To the extent appropriate, a claim of priority is made to each of the above disclosed applications.

TECHNICAL FIELD

This invention relates to metal composite panels and to a core composition, or core filler composition, used for making them. This invention also relates to a process for making the metal composite panels by extruding the core composition or core filler composition between two metal panels and calendaring the metal panels to form the metal composite panels.

BACKGROUND

Aluminum Sandwich Panels (also known as aluminum composite materials ACM) are used in architectural applications, such as to cover the outside surface of buildings (façade). ACM are widely used in countries in Europe, Middle East and parts of the former Soviet Union. ACM typically consist of two aluminum panels, (i.e., sheets or layers), with a usual thickness of about 0.5 mm, and a polymer core composition between the panels containing flame retardants, and having a usual thickness of about 3 mm. Normally, these ACM are produced via extrusion and calendaring. In Europe, they have to comply with regulations relevant for construction, such as the important fire safety construction product regulations (CPR). Depending on the height of the building, either Euroclass B (for buildings up to 20 m tall) or Euroclass A2 (for buildings taller than 20 m) regulations need to be passed.

Euroclass B panels have to pass the SBI test. This test is conducted in a room in which the samples (1.0×1.5 m+0.5× 1.5 m) are mounted in a 90° angle and exposed to a gas burner flame. The fire growth rate (FIGRA) needs to be max 120 W/s and the total heat released (THR 600s) has to be max 7.5 MJ. Besides the SBI test, EN 11925-2 also needs to be passed with a flame spread max 150 mm within 60 seconds. The Euroclass B fire safety test is typically easy to achieve. To meet these requirements, aluminum hydroxide (ATH) can be utilized as flame retardant in polymer composition with a loading of around 70-75% by weight ATH.

The Euroclass A2 fire safety test is more difficult to achieve. Although Euroclass A2 panels also must be able to pass the SBI test, and have the same limits as Euroclass B panels, the more demanding hurdle is the bomb calorimeter test according to EN ISO 1716 entitled "Reaction to fire tests for building and transport products—Determination of heat of combustion". The polymer core material has to have a calorific potential (PCS) of max 3.0 MJ/kg. That typically means a polymer or organic content of 10 wt % max, and an inorganic flame retardant loading of over 90 wt %. As disclosed in EP 2420380 A1, these high inorganic loadings cannot be extruded and thus cannot use the existing extrusion/calendaring systems used in the industry. One must use an alternative system, such as the compression molding technology described in EP 2420380 A1. This is a distinct disadvantage since the cost is high for installing new equipment.

Accordingly, there is a need to formulate polymeric core compositions for ACM having over 90 wt % inorganic flame retardants such that the compositions can be extruded and are able to pass the Euroclass A2 fire safety tests.

SUMMARY OF THE INVENTION

The present application relates to a core composition comprising: (1) a polymer material, (2) a lubricant selected from the group consisting of fatty acids, fluoropolymers, metallic fatty acids, paraffin wax, polyethylene wax, polysiloxanes, polyalkylsiloxanes and polyorganosiloxanes with functional groups and (3) greater than or equal to about 90 wt % of a flame retardant comprising aluminum hydroxide (ATH) and/or alumina.

The present application also relates to a core filler composition comprising: (1) a polymer material, (2) a lubricant selected from the group consisting of fatty acids, fluoropolymers, metallic fatty acids, paraffin wax, polyethylene wax, polysiloxanes, polyalkylsiloxanes and polyorganosiloxanes with functional groups, (3) an inorganic filler and (4) a flame retardant comprising aluminum hydroxide (ATH) and/or alumina, wherein the amount of inorganic filler is about 20 wt % to about 40 wt % and the amount of flame retardant is about 50 wt % to about 70 wt %, based on the total weight of the core filler composition.

The present application also relates to a metal panel composite comprising two outer metal layers and the core composition or core filler composition described above between the outer metal layers.

The present application further relates to a process for producing a metal panel composite comprising extruding the core composition or core filler composition, conveying said extruded core composition into a calendar having two or more rollers carrying metal panels having an inner and outer surface, wherein the inner surface of the metal panels is brought into contact with the core composition, and wherein the rollers provide pressure on the outer surface of the metal panel to form the metal panel composite.

BRIEF DESCRIPTION OF THE DRAWINGS

FIG. 1 is an explanatory drawing of a conventional apparatus for manufacturing composite panels.

DETAILED DESCRIPTION OF THE INVENTION

The present application relates, in part, to a core composition comprising: (1) a polymer material, (2) a lubricant selected from the group consisting of fatty acids, fluoropolymers, metallic fatty acids, paraffin wax, polyethylene wax, polysiloxanes, polyalkylsiloxanes and polyorganosiloxanes with functional groups and (3) greater than or equal to about 90 wt % of a flame retardant comprising aluminum hydroxide (ATH) and/or alumina.

The core composition of the present application provides a distinct advantage in that it can be compounded (i.e., produced) by a twin screw extruder, Buss Ko kneader, or internal mixer and subsequently processed by extrusion. This is advantageous because extrusion and calendaring is the common method used to produce metal composite panels and thus no major change is equipment or process is required. This saves time and cost to the industry. The core composition also allows the panels to pass the Euroclass A2 fire safety tests.

One of the components in the core composition is a polymer. Any suitable polymer used in the composite panel art may be used. Non-limiting examples of such polymers are: polyethylene, polypropylene, polyisoprene, polybutadiene, styrene-butadiene, butadiene-acrylonitrile copolymer, ethyl-vinyl acetate (EVA), ethylene acrylic elastomers (ethylene-ethyl acrylate copolymer, ethylene-methyl acrylate copolymer), ethylene-propylene copolymer, ethylene-propylene diene copolymer, or ethylene-vinyl alcohol copolymer. A preferred polymer is EVA.

The amount of polymer may range from about 4 wt % to about 9 wt % or about 5 wt % to about 8 wt %, based on the weight, lubricant and flame retardant. The range of polymer may be increased or decreased based on the calorific potential (PCS) of the polymer Another component of the core composition is a lubricant. Examples of lubricants that may be used are: fatty acids, fluoropolymers, metallic fatty acids, paraffin wax, polyethylene wax, polysiloxanes, polyalkylsiloxanes and polyorganosiloxanes with functional groups. Commercial lubricants that may be used are vinyl functionalized polysiloxanes like Tergomer® V-Si 4042 from Evonik, stearic fatty acids like Pristerene™ 4913 from Croda, polydimethylsiloxane AK150 from Wacker, fluoropolymer Dynamar™ FX 5912 X from 3M, and polyethylene based waxes like A-C 400A and A-C 573 A from Honeywell.

The amount of lubricant may range from about 1 wt % to about 5 wt %, or about 2 wt % to about 5 wt %, or about 2 wt % to about 4 wt %, based on the weight of the polymer, lubricant and flame retardant.

The core composition also contains a mineral flame retardant. The mineral flame retardant is Aluminum hydroxide, $Al(OH)_3$, (a.k.a. aluminum trihydroxide, ATH) and/or alumina ($Al_2O_3$). "And/or" means either component alone or a mixture of the components. The amount of mineral flame retardant in the core composition is greater or equal to about 90 wt %. The upper range is about 92 wt % or about 93 wt % since higher amounts would lead to a highly viscous composition, which may not be able to be extruded. The term "about" means approximately ±1 wt % or ±0.5 wt %, depending on the PCS of the polymer and the viscosity of the core composition.

Preferably, the ATH has a particular particle size distribution (PSD) with $d_{50}$ ranging from about 75 μm to about 150 μm, $d_{10}$ ranging from about 40 μm to about 70 μm and a $d_{90}$ ranging about 100 μm to about 200 μm. The term $d_{50}$ means the diameter where half of the volume of the particles have a diameter below this value. Likewise, the term $d_{10}$ means that 10% of the volume of the particles have a diameter below this value and $d_{90}$ means that 90% of the volume of the particles have a diameter below this value.

One method to measure PSD is to use laser diffraction by using a Cilas 1064 L laser spectrometer from Quantachrome. Generally, the procedure used herein to measure the particle size by first introducing a suitable water-dispersant solution (preparation see below) into the sample-preparation vessel of the apparatus. The standard measurement called "Particle Expert" is then selected, the measurement model "Range 2" is also selected, and apparatus-internal parameters, which apply to the expected particle size distribution, are then chosen. It should be noted that during the measurements the sample is typically exposed to ultrasound for about 60 seconds during the dispersion and during the measurement. After a background measurement has taken place, from about 150 to about 200 mg of the sample to be analyzed is placed in the sample vessel with the water/dispersant solution and the measurement started. The water/dispersant solution can be prepared by first preparing a concentrate from 500 g Calgon, available from KMF Laborchemie, with 3 liters of CAL Polysalt, available from BASF. This solution is made up to 10 liters with deionized water. 100 ml of this original 10 liters is taken and in turn diluted further to 10 liters with deionized water, and this final solution is used as the water-dispersant solution described above.

Preferably, when alumina is used as the flame retardant, the alumina is a mixture of two alumina grades. The first grade is a fine alumina grade having a particle size distribution with a $d_{50}$ ranging from about 0.5 μm to about 4 μm, a $d_{10}$ ranging from about 0.2 μm to about 0.7 μm and a $d_{90}$ ranging from about 2 μm to about 9 μm. The second grade is a coarse alumina grade having a particle size distribution with a $d_{50}$ ranging from about 14 μm to about 36 μm, a $d_{10}$ ranging from about 1 μm to about 17 μm, and a $d_{90}$ ranging from about 30 μm to about 60 μm. The weight ratio of the fine grade to the coarse grade is about 1:9 to 9:1.

The inventor has discovered that the PSDs for ATH and/or alumina described above are beneficial for allowing the core composition to be extruded.

The core composition also may contain an antioxidant wherein said antioxidant is a hindered phenol, organophosphites, thioesters or ethoxylated fatty amines. Preferably, the antioxidant is tetrakis [methylene-3-(3,5-di-tert-butyl-4-hydroxyphenyl-propionate)]methane, N-Octadecyl-beta-(3,5-di-tert-butyl-4-hydroxyphenyl)-propionate; N,N'-hexane-1, 6-diylbis [3-(3,5-di-tert-butyl-4-hydroxyphenyl) propionamide]; N'-Bis(3,5-di-butyl-4-hydroxylephenylpropionyl)hydrazine; tris(3,5-di-tert-butyl-4-hydroxybenzyl)isocyanurate; Benzene propanoicacid, 3,5-bis(1, 1-dimethylethyl)-4-hydroxy-, (1,2-dioxo-1, 2-ethanediyl)-bis(imino-2,1-ethanediyl)ester; Pentaerythritol-Tetrakis [3-(3,5-di-tert-butyl-4-hydroxyphenyl) propionate] or 2,6-di-tert-butyl-4-ethylphenol.

The amount of antioxidant may range from about 0.01 wt % to about 1 wt % or about 0.01 wt % to about 0.5 wt %, or about 0.05 wt % to about 0.3 wt %, based on the weight of the polymer, lubricant, flame retardant and antioxidant.

The present application also relates to a core filler composition comprising: (1) a polymer material, (2) a lubricant selected from the group consisting of fatty acids, fluoropolymers, metallic fatty acids, paraffin wax, polyethylene wax, polysiloxanes, polyalkylsiloxanes and polyorganosiloxanes with functional groups, (3) an inorganic filler and (4) a flame retardant comprising aluminum hydroxide (ATH) and/or alumina, wherein the amount of inorganic filler is about 20 wt % to about 40 wt % and the amount of flame retardant is about 50 wt % to about 70 wt %, based on the total weight of the core filler composition.

The inorganic filler may be common inorganic fillers used in the art. Preferably the inorganic fillers are spherical in nature (e.g., spheres, cubes, aspect ratio or circularity of particles close to unity) rather than plates or flakes, so that they do not increase the viscosity of the core filler composition. However, other particle shapes can be used as well ending up in higher viscosity than the spherical ones. Examples of inorganic fillers are compounds such as carbonates, sulfates ($CaCO_3$, $BaSO_4$, $CaSO_4$, etc.), and silicates (talc, kaolin, etc.). Preferably the inorganic filler is calcium carbonate. The PSD of the fillers should be similar to that of the ATH particles, (e.g., particle size distribution (PSD)) with $d_{50}$ ranging from about 75 μm to about 150 μm, $d_{10}$ ranging from about 40 μm to about 70 μm and a $d_{90}$ ranging from about 100 μm to about 200 μm).

The total amount of filler and flame retardant in the core filler composition should be greater or equal to about 90 wt %, with an upper range of about 92 wt % or about 93 wt %, based on the total weight of the core filler composition. The amount of the other components in the core filler composition is the same as the core composition described above.

The core composition and core filler composition may contain further optional additives such as tackifiers, smoke reducers, and the like.

The mineral flame retardant may also contain some magnesium hydroxide (MDH), but preferably no MDH is in the core composition. The amount of MDH may range from about 0 wt % to about 10 wt %, based on the total weight of the mineral flame retardant.

The present application also relates to a metal panel composite comprising: (1) two outer metal (panel) layers and (2) the core composition described above between said outer metal layers.

The metal for the metal layers may be any metal used in the art. Non-liming examples are metallic materials such as iron, steel, zinc, tin, zinc-coated iron, copper, bronze, aluminum and aluminum alloys. Preferably, both of the outer layers are made of aluminum or aluminum alloys, although it is conceivable to use two different materials.

The metal layers have an inner and outer surface. The inner surface is in contact with the core composition.

In one embodiment, the inner surface of the metal layer has a coating of sodium silicate, which acts as an adhesive between the inner surface of the metal layer and the core composition. Sodium silicate, commonly known as "water glass" is a versatile, inorganic chemical made by combining various ratios of sand and soda ash.

In the present application, a sodium silicate solution (e.g., 35% $Na_2SiO_3$ solution in water) can be applied to the inner surface by a brush or other application device. The metal surface (e.g., aluminum sheet) is scratched or roughened, and then cleaned with a solvent (e.g., isopropanol) prior to sodium silicate application to allow for better adhesion. The amount of sodium silicate that may be used can range from about 0.005 ml/cm$^2$ to about 0.02 ml/cm$^2$.

The metal sheets or layers are allowed to dry (there needs to be some residual water in the sodium silicate to enable adhesion) before being contacted with the core composition.

The present application also relates to a process for producing a metal panel composite comprising extruding the core composition or core filler composition, conveying said extruded core composition or core filler composition into a calendar having two or more rollers carrying metal panels having an inner and outer surface, wherein the inner surface of the metal panels is brought into contact with the core composition or core filler composition, and wherein the rollers provide pressure on the outer surface of the metal panel to form the metal panel composite. As before, the metal panels (i.e., sheets or layers) are preferably made of aluminum or an aluminum alloy, and the inner surface of the metal panels have a coating of sodium silicate. The core composition or core filler composition preferably contains ethylene vinyl acetate, fatty acid lubricant, and ATH.

The process described above is the typical process used in the industry, but the core composition typically only contains around 70% mineral flame retardants. As described above, a composition having a mineral flame retardant loading of over 90% that can be extruded is not believed to have been previously achieved.

Fabrication processes known from the state of the art of metal composite panels typically consist of an extruder (e.g., single screw extruder, twin screw extruder), which extrudes the core composition or core filler composition material. This extrusion process is typically done with heating of the raw core material in the extruder by heat or by friction in the extruder. In the present application, it is preferred that heating in the extruder is performed to more easily allow the core composition to be extruded. Subsequently, the extruded core composition or core filler composition material is transferred to a calendaring device containing one or more pairs of laminating rolls by means of a conveyor. During the transport from the extruder to the laminating rolls, the core material may be heated (about 50° C. to about 190° C.) to heat or melt the organic materials in the core composition or core filler composition. The metal layers or sheets are then introduced into the gap between the pair of laminating rolls, which bonds the core composition or core filler composition to the inner surface of the metal layers or sheets.

FIG. 1 shows a schematic view of a typical or representative apparatus for manufacturing composite panels. In a first step, the core composition mixture 10, is inserted into a hopper 12 on the extruder 14. The extruder 14 may contain a series of heating elements 30 to heat core composition mixture 10 in extruder 14. The extruded core composition 16 is extruded from extruder 14 and subsequently conveyed to the calendaring device 28 containing laminating rolls 26 via a conveyor 18.

During conveyance of extruded core composition 16 along the conveyors 18, the extruded core composition 16 may be heated by a pre-heat core oven 20. In the next step, the extruded core composition 16 is inserted into the gap between the pair of laminating rolls 26, bonding the extruded core composition 16 with two outer metal layers 24. As shown in FIG. 1, the calendaring device 28, consists of laminating rolls 26, carrying the two outer layers 24 for attachment to the extruded core composition 16. Each of the two outer metal layers 24 may comprise a film 22 of sodium silicate solution bonded to the inner surface of outer metal layer 24. The inner surface of the outer metal layers 24 is then brought in contact with the extruded core composition 16, by applying pressure to the outer surface of outer metal layers 24. As a consequence, the optional warm and melted organic materials in extruded core composition 16 are bonded to the two outer metal layers 24 to establish a strong connection after the composite panel is cooled down.

EXAMPLES

The following Examples illustrate the present invention. It is to be understood, however, that the invention, as fully described herein and as recited in the Claims, is not intended to be limited by the details of the following Examples.

Example 1

A twin screw extruder (model KraussMaffei Berstorff ZE 25 A×44 DUTX 8) was used to prepare a sample with the following composition:

| | |
|---|---|
| EVA: Escorene ™ 5540 from ExxonMobil Chemical | 6.93 wt % |
| Coarse ATH: ($d_{10}$ = 61 μm; $d_{50}$ = 102 μm; $d_{90}$ = 151 μm) | 90.0 wt % |
| Stearic acid: | 3.0 wt % |
| Antioxidant: Ethanox ® 310 from Si Group | 0.07 wt % |

The screw profile was set-up to avoid build-up of high shear forces. The polymer was added with the stearic acid and the Ethanox through the first feeder. The coarse ATH was added via the first side feeder. Temperatures were set to 120-140° C. depending on the zones. Screw speed was reduced to 200 rpm. The viscosity of the extruder core composition was low enough so that it could be extruded using a slit die and would be able to be used in an extrusion/calendaring process to make ACM. The ATH loading of 90 wt % was confirmed via loss of ignition. The PCS of the core composition was 2.92 MJ/kg, which passes the requirements needed for the more demanding Euroclass A2 panels.

Examples 2 to 9

Formulations in Examples 2 to 9 were compounded utilizing a Buss Kneader (Model MDK 46 Buss Ko kneader, PR46B-11) with attached granulation extruder. In the kneader, the screw speed was about 160 rpm, the kneader shaft temperature about 160° C. and barrel zones 1 and 2 were about 115° C. The granulation extruder had a granulation temperature setting of 120° C. and a die temperature setting ranging from 130° C. to 150° C. Compounding throughput was about 15 kg/hr.

Components used in the formulations include:

| | |
|---|---|
| EVA: | Escorene ™ 5540 and 33-400 from ExxonMobil Chemical and Evatane ® 33-400 from Arkema |
| Aughinish ATH: | ($d_{10}$: 61 μm; $d_{50}$: 102 μm; $d_{90}$: 151 μm) |
| Stade ATH | ($d_{10}$: 49 μm, $d_{50}$: 92 μm, $d_{90}$: 140 μm) |
| Omyacarb 1Av | Calcium carbonate from from OMYA ™ |
| PE Wax A-C 573 P | maleic anhydride polyethylene wax from Honeywell Corp |
| Fatty Acid 4913 | stearic fatty acid Pristerene ™ from Croda |

Power ratings and standard deviation of the kneader and granulator were recorded. Formulations with the lower power ratings and standard deviation were the easiest to compound and can be extruded to make the aluminum sandwich panels of the present application.

Adhesion tests were conducted via pressing of the compound between 2 aluminum sheets (0.5 mm thick each). Conditions of pressing were 300 or 50 bars at 175° C. for about 10 minutes. After 1 hour of cooling time the sandwich was broken manually and visually assessed. The higher the area of the compound still sticking to the aluminum sheets, the better the adhesion.

TABLE 1

| | Examples | | | | | | | | | |
|---|---|---|---|---|---|---|---|---|---|---|
| | 2 | 3 | 4 | 5 | 6 | 7 | 7B | 8 | 9 | |
| EVA 5540 | 6 | 6 | 6 | 7 | | 7 | 7 | 8 | 6 | % |
| EVA 33-400 | | | | | 6 | | | | | % |
| Aughinish ATH | 89 | 89 | | 88 | 89 | 90 | 90 | 90 | | % |
| Stade ATH | | | 89 | | | | | | 89 | % |
| Omyacarb 1AV | | | | 2 | | | | | | % |
| Fly ash | 2 | 2 | 2 | | 2 | | | | 2 | % |
| Fatty acid 4913 | 3 | | 3 | 3 | 3 | 3 | 3 | 2 | 3 | % |
| PE wax A-C 573 P | | 3 | | | | | | | | % |
| Total | 100 | 100 | 100 | 100 | 100 | 100 | 100 | 100 | 100 | % |
| Median value granulation extruder | 3.37 | 5.14 | 8.28 | 5.70 | 4.64 | 3.95 | 3.68 | 6.03/ 5.36 | 7.22 | kW |
| Standard deviation granulation extruder | 16.2 | 12.8 | 20.4 | 42.1 | 28.7 | 12.5 | 16.7 | 73.9/ 47.8 | 35.5 | % |
| Median value kneader | 2.49 | 3.03 | 3.18 | 2.15 | 2.2 | 2.37 | 2.44 | 2.17/ 2.42 | 2.12 | kW |
| Standard deviation kneader | 12.9 | 20.7 | 26.9 | 33.2 | 13.4 | 14.3 | 16.3 | 59.3/ 46.9 | 23.8 | % |
| Humidity after compounding | 2.76 | 0.94 | 1.19 | 0.29 | 0.7 | 0.65 | | 0.14 | 0.45 | % |
| Extrusion will work | x | x | x | x | x | x | x | | x | |
| Extrusion will not work | | | | | | | | x | | |
| Undried Compounds Adhesion to Al (10 min) | good | better | | | little | | | | | 300 bar @ 100° C. |
| Undried Compounds Adhesion to Al (10 min) | high flow | good | | | good | bad | | | | 50 bar @ 175° C. |
| Dried Compounds Adhesion to Al (10 min) | bad | good | | | bad | poor | | | | 50 bar @ 175° C. |

Examples 10 to 12

Formulation Examples 10 to 12, according to Table 2, were prepared in a Haake lab kneading chamber which has a volume of 310 ml. The entire formulation amount was about 450 g each. The formulation was compounded in the kneader for about 20 minutes. Set up temperature was 175° C. After the 20 minutes kneading time, the compounded material was taken out of the kneader to cool down. After cooling down to room temperature, the compound was granulated using a lab pelletizer (knife mill).

Measurement of the $CaCO_3$ particle size distribution was not possible because the product was too coarse. Instead, a wet sieve analysis was conducted. The results were: >1000 µm was 0.0%; >300 µm was 45.8%; >200 µm was 25.2%; >100 µm was 14.6%; >75 µm was 2.6%; >45 µm was 2.5%; <45 µm was 9.3%

TABLE 2

| | Examples | | | |
|---|---|---|---|---|
| | 10 | 11 | 12 | |
| EVA 5540 | 7 | 7 | 5 | % |
| $CaCO_3$ coarse grade | 20 | 40 | 0 | % |
| Aughinish ATH dry | 70 | 50 | 87 | % |
| Fatty acid 4913 | 3 | 3 | 3 | % |
| Fly ash | 0 | 0 | 5 | % |
| Sum | 100 | 100 | 100 | % |
| Extrusion will work* | x | x | x | |

*In the lab, the compounds couldn't be extruded because they were too soft and blocked the lab extruder screw. However, these formulations would work on a normal commercial extruder.

Examples 13 to 25

Formulations Examples 13 to 25 according to Table 4 were compounded using similar kneading parameters in Examples 10 to 12. Formulation 15-040 had two samples (Numbers 13 and 25), which were a mixture of EVA, fatty acids and ATH particles as shown below in Table 3. Both as prepared and dried samples were used in Examples 13 to 25 to show the effects of humidity on compounding.

TABLE 3

| 15-040 | 13 | 24 | % |
|---|---|---|---|
| EVA 5540 | 8.4 | 8.4 | % |
| FS 4913 | 3.6 | 3.6 | % |
| Dry Aughinish ATH | 88 | | % |
| Dry Stade ATH | | 88 | % |
| Sum | 100 | 100 | % |

Components used in the formulations that have not mentioned previously include:
Evatane® 33-400 is an EVA from Arkema.
OL-104LEO is Martinal® OL-104 LEO ATH from Albemarle Corp. with a d50 of 1.7 to 2.1 µm
Magnifin® H-5 is magnesium hydroxide from Albemarle Corp. with a d50 of 1.6 to 2.0 µm
Fly ash is from Martinswerk lignite fired power plant
Glass Hollow Spheres iM16K from 3M Corporation with average diameter of 20 µm
BaSO4 Sachtosperse in a nanometer sized Barium Sulfate from Sachtleben Chemie
Compalox ON/V-801 is compacted coarse ATH flame retardant from Albemarle Corp with grain size of 0.3 to 1 mm.

TABLE 4

| | Examples | | | | | | | | | | | | | |
|---|---|---|---|---|---|---|---|---|---|---|---|---|---|---|
| | 13 | 14 | 15 | 16 | 17 | 18 | 19 | 20 | 21 | 22 | 23 | 24 | 25 | |
| 15-040-13 | 83 | 83 | 83 | 83 | 83 | 83 | 83 | 83 | | | | 83 | | % |
| 15-040-13 dried | | | | | | | | | | | | | 83 | % |
| 15-040-24 | | | | | | | | | | 83 | | | | % |
| EVA 5540 | | | | | | | | | | | 7 | | | % |
| Evatane 33-400 | | | | | | | | | 7 | | | | | % |
| Aughinish dried | | | | | | | 17 | 90 | | | | | | % |
| OL-104 LEO | 17 | | | | | | | | | | | | | % |
| Magnifin H-5 | | 17 | | | | | | | | | | | | % |
| Fly ash | | | 17 | 17 | | | | | | | 17 | | 17 | % |
| Water | | | | 1 | | | | | | | | | | % |
| Glass hollow spheres iM16K | | | | | 17 | | | | | | | | | % |
| BaSO4 Sachtosperse HU-N | | | | | | 17 | | | | | | | | % |
| CaCO3 OmyaCarb 1AV | | | | | | | 17 | | | | | | | % |
| Fatty acid 4913 | | | | | | | | | | 3 | | 3 | | % |
| Compalox ON/V-801 | | | | | | | | | 90 | | | 17 | | % |
| Sum | 100 | 100 | 100 | 100 | 100 | 100 | 100 | 100 | 100 | 100 | 100 | 100 | 100 | % |
| Max kneading torque | 80 | 88 | 37 | 28 | 27 | 89 | 104 | 49 | 24 | 30 | 49 | 54 | 30 | Nm |
| PCS (ISO 1716) | | | 3.69 | | | | | | | | | | | MJ/kg |
| Extrusion will work | | | | x | x | x | | | x | x | x | x | | x |
| Extrusion won't work | x | x | | | | | x | x | | | | | x | |

Examples 26 to 35

Formulations Examples 26 to 35 according to Table 5 were compounded using similar kneading parameters in Examples 2 to 9 with granulator.

TABLE 5

| | Examples | | | | | | | | | | |
|---|---|---|---|---|---|---|---|---|---|---|---|
| | 26 | 27 | 28 | 29 | 30 | 31 | 32 | 33 | 34 | 35 | |
| EVA 5540 | 17.5 | 14 | 10.5 | 9.8 | 9.1 | 8.4 | 7.7 | 7 | 8.4 | 8.4 | % |
| FS 4913 | 7.5 | 6 | 4.5 | 4.2 | 3.9 | 3.6 | 3.3 | 3 | 3.6 | 3.6 | % |
| Dry Aughinish ATH | 75 | 80 | 85 | 86 | 87 | 88 | 89 | 90 | 88 | 88 | % |
| Sum | 100 | 100 | 100 | 100 | 100 | 100 | 100 | 100 | 100 | 100 | % |
| Median value granulation extruder | 2.05 | 2.78 | 3.98 | 3.76 | 4.08 | 3.85 | 1.66 | | 2.1 | 3.68 | kW |
| Standard deviation granulation extruder | 3.2 | 4.3 | 12.7 | 9.2 | 14.4 | 20.0 | 2.8 | | | 14.3 | % |
| Median value kneader | 3.1 | 3.01 | 2.94 | 2.83 | 2.76 | 2.55 | 2.58 | | 2.25 | 2.59 | kW |
| Standard deviation kneader | 4.9 | 5.3 | 10.2 | 10.6 | 12.3 | 12.3 | 15.7 | | | 12.5 | % |
| Loss on ignition | | | | | | 42.3 | | 40.6 | | | % |
| Filler loading | | | | | | 88.3 | | 90.9 | | | % |
| PCS (ISO 1716) | | | | | | 3.85 | | 1.75 | | | MJ/kg |
| Extrusion will work | x | x | x | x | x | x | x | x | x | x | |

Compounds 32 & 33 were prepared without die plate on granulator (to reduce the back pressure)

Examples 36

A twin screw extruder (KraussMaffei Berstorff ZE 25 A×44 DUTX 8) was used to prepare the formulation Example 36 according to Table 6. The screw profile was set-up to avoid build-up of high shear forces. The polymer was added with the Fatty Acid and the Ethanox 310 antioxidant through the first feeder. The coarse ATH was added via the first side feeder. Temperatures were set to 120-140° C. depending on the zones. Screw speed was 200 rpm.

TABLE 6

| | Example 36 | |
|---|---|---|
| EVA 5540 | 6.93 | % |
| Fatty acid 4913 | 3 | % |
| Aughinish ATH dry | 90 | % |
| Ethanox 310 | 0.07 | % |
| Loss on ignition | 41.00 | % |
| ATH loading | 90.07 | % |
| PCS (ISO 1716) | 2.92 | MJ/kg |
| Extrusion worked | x | |

Examples 37 to 45

Formulations Examples 37 to 45 according to Table 7 were compounded using similar kneading parameters in Examples 10 to 12.

Components used in the formulations that have not mentioned previously include:

Escorene™ UL 5540 is an EVA from ExxonMobil Chemical

Levapren® 500 HV is an EVA from Lanxess GmbH dusted with silica and talc

Gardanne is an ATH with $d_{10}$: 40 μm, $d_{50}$: 82 μm, $d_{90}$: 144 μm

ON320S is Martinal® ON 320S with a $d_{50}$ of 15 to 25 μm

Auginish/ON320S/OL104LEO 50/25/25 is a mixture of ATH particles in those proportions V-SI 4042 is a vinyl modified silane Tergomer® from Evonik Industries A-C 400 A, 573 and 540 are polyethylene waxes from Honeywell E 310 is Ethanox® 310 antioxidant from Si Group phr mean parts per hundred parts resin (e.g., EVA resin)

TABLE 7

| | Example | | | | | | | | | |
|---|---|---|---|---|---|---|---|---|---|---|
| | 37 | 38 | 39 | 40 | 41 | 42 | 43 | 44 | 45 | |
| Escorene UL 5540 | 100 | 100 | 100 | 100 | 100 | 100 | 100 | 100 | | phr |
| Levapren 500 HV | | | | | | | | | 100 | phr |
| Gardanne ATH dry | 900 | | | | | | | | | phr |
| Auginish ATH dry | | 900 | 900 | 900 | 900 | 900 | 900 | | 850 | phr |
| Auginish/ON 320S/OL104L EO 50/25/25 | | | | | | | | 900 | | phr |

TABLE 7-continued

| | Example | | | | | | | | | |
|---|---|---|---|---|---|---|---|---|---|---|
| | 37 | 38 | 39 | 40 | 41 | 42 | 43 | 44 | 45 | |
| Fatty acid 4913 | 27 | 27 | | | | | | 27 | 27 | phr |
| Dynamar FX 5912X | | | 9 | | | | | | | phr |
| Si V-4042 | | | | 27 | | | | | | phr |
| A-C 400 A | | | | | 27 | | | | | phr |
| A-C 573 A | | | | | | 27 | | | | phr |
| A-C 540 A | | | | | | | 27 | | | phr |
| E 310 | 0.75 | 0.75 | 0.75 | 0.75 | 0.75 | 0.75 | 0.75 | 0.75 | 0.75 | phr |
| Torque @ end of compounding | 14.6 | 23 | 20.2 | 18.3 | 21.1 | 16.7 | 18.8 | 111 | 42.7 | Nm |
| Temperature @ end of compounding | 165.4 | 168.3 | 177.6 | 165.1 | 165.4 | 164.4 | 164.6 | 179.8 | 168.8 | ° C. |
| Extrusion will work | x | x | x | x | x | x | x | | | |
| Extrusion won't work | | | | | | | | x | x | |

Examples 46 to 57

Formulations Examples 46 to 57 according to Table 8 were compounded using similar kneading parameters in Examples 10 to 12 without granulator.

Components used in the formulations that have not mentioned previously include:
San Cyprian ATH with $d_{10}$: 71 µm, $d_{50}$: 111 µm, $d_{90}$: 158 µm
Silicone Oil AK 150 is a silicone oil from Wacker-Chemie GmbH collected in a metal box. Temperature of screw was 160° C. and zones 1 and 2 were 180° C.; screw speed 120-130 rpm. Max compound temperature was about 190° C.

The entire amount of Tegomer V-Si 4042 was added to the 70% of mineral FR used for the first compound in a Thyssen-Henschel mixer. The previously selected additive Tegomer FR100 was replaced with liquid V-Si 4042 because of the impact on melt flow. The liquid additive results in a much higher flowability of the compound.

TABLE 8

| | Examples | | | | | | | | | | | | |
|---|---|---|---|---|---|---|---|---|---|---|---|---|---|
| | 46 | 47 | 48 | 49 | 50 | 51 | 52 | 53 | 54 | 55 | 56 | 57 | |
| EVA 4028 | 100 | 100 | 100 | 100 | | | | | | | | | phr |
| Escorene UL 5540 | | | | | 100 | 100 | 100 | 100 | 100 | 100 | 100 | 100 | phr |
| Stade ATH dry | 900 | | | | | | | | | | | | phr |
| San Cyprian ATH dry | | 900 | | | | | | | | | | | phr |
| Gardanne ATH dry | | | 900 | 900 | 900 | 900 | 900 | 900 | 750 | 800 | 830 | 850 | phr |
| Si V-4042 | | | | | 9 | | | | 7.5 | 8 | 8.3 | 8.5 | phr |
| Silicone oil AK 150 | | | | | | 9 | | | | | | | phr |
| Fatty acid 4913 | | | | 27 | | | 27 | | | | | | phr |
| E 310 | 0.8 | 0.8 | 0.8 | 0.8 | 0.8 | 0.8 | 0.8 | 0.8 | 0.8 | 0.8 | 0.8 | 0.8 | phr |
| Kneader torque @ end | 90 | 35 | 27 | 38 | 17 | 22 | 25 | 25 | 8 | 13 | 14 | 16 | Nm |
| Extrusion will work | | x | x | x | x | x | x | x | x | x | x | x | |
| Extrusion won't work | x | | | | | | | | | | | | |

Examples 58 to 59

Formulations Examples 58 to 59 in Table 9 were compounded utilizing a Buss Kneader (Model MDK 46 Buss Ko kneader) without granulation extruder.

The Examples were compounded using a two-step process as follows: first preparation of the formulation with 70% mineral FR loading using the standard Buss set-up (split feed 50/50); second compounding of the 70% formulation with the remaining quantity of mineral filler. Because of the extremely high loading it was necessary to replace the restrictor elements through those having a larger opening for the second run in which the 70% loaded compound was added with the remaining amount of mineral FR. The granulation extruder was detached and the compound came out of the Buss kneader as a coarse powder which was

TABLE 9

| | Examples | | |
|---|---|---|---|
| | 58 | 59 | |
| EVA 4028 | 100 | 100 | phr |
| Tegomer V-SI 4042 | 8 | 8 | phr |
| Martinal ON-921 | 1400 | | phr |
| Magnifin H-5 | | 467 | phr |
| Martinal ON-320 | | 467 | phr |
| Martinal ON | | 467 | phr |
| Ethanox 310 | 0.75 | 0.75 | phr |
| Average kneader power | 2.93 | 2.79 | kW |
| Standard deviation kneader | 40.4 | 26.6 | % |

TABLE 9-continued

|  | Examples | |  |
| --- | --- | --- | --- |
|  | 58 | 59 |  |
| PCS (ISO 1716) | <1 | <1.3 | MJ/kg |
| *Extrusion won't work | x |  |  |
| *Extrusion will work |  | x |  |

*Different results concerning extrusion because of different standard deviation of kneader engine.

Components referred to by chemical name or formula anywhere in the specification or claims hereof, whether referred to in the singular or plural, are identified as they exist prior to coming into contact with another substance referred to by chemical name or chemical type (e.g., another component, a solvent, or etc.). It matters not what chemical changes, transformations and/or reactions, if any, take place in the resulting mixture or solution as such changes, transformations, and/or reactions are the natural result of bringing the specified components together under the conditions called for pursuant to this disclosure. Thus the components are identified as ingredients to be brought together in connection with performing a desired operation or in forming a desired composition. Also, even though the claims hereinafter may refer to substances, components and/or ingredients in the present tense ("comprises", "is", etc.), the reference is to the substance, component or ingredient as it existed at the time just before it was first contacted, blended or mixed with one or more other substances, components and/or ingredients in accordance with the present disclosure. The fact that a substance, component or ingredient may have lost its original identity through a chemical reaction or transformation during the course of contacting, blending or mixing operations, if conducted in accordance with this disclosure and with ordinary skill of a chemist, is thus of no practical concern.

The invention described and claimed herein is not to be limited in scope by the specific examples and embodiments herein disclosed, since these examples and embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

The invention claimed is:

1. A core composition comprising: a polymer, a lubricant selected from the group consisting of fatty acids, fluoropolymers, metallic fatty acids, paraffin wax, polyethylene wax, polysiloxanes, polyalkylsiloxanes and polyorganosiloxanes with functional groups, and greater than or equal to about 90 wt % of a flame retardant comprising aluminum hydroxide (ATH); wherein:

the ATH has a particle size distribution characterized by a $d_{50}$ ranging from about 75 µm to about 150 µm, a $d_{10}$ ranging from about 40 µm to about 70 µm, and a $d_{90}$ ranging from about 100 µm to about 200 µm.

2. The core composition of claim 1, wherein the amount of polymer is about 4 wt % to about 9 wt %, the amount of lubricant is about 1 wt % to about 5 wt %, all based on the total weight of the polymer, lubricant, and flame retardant.

3. The core composition of claim 1, wherein the polymer is polyethylene, polypropylene, polyisoprene, polybutadiene, styrene-butadiene, butadiene-acrylonitrile copolymer, ethyl-vinyl acetate (EVA), ethylene acrylic elastomers, ethylene-ethyl acrylate copolymer, ethylene-methyl acrylate copolymer, ethylene-propylene copolymer, ethylene-propylene diene copolymer, or ethylene-vinyl alcohol copolymer.

4. The core composition of claim 3, further comprising an antioxidant wherein said antioxidant is a hindered phenol, organophosphites, thioesters or ethoxylated fatty amines.

5. The core composition of claim 4, wherein the antioxidant is Tetrakis [methylene-3-(3,5-di-tert-butyl-4-hydroxyphenyl-propionate)]methane; N-octadecyl-beta-(3,5-di-tert-butyl-4-hydroxyphenyl)-propionate; N,N'-hexane-1,6-diylbis[3-(3,5-di-tert-butyl-4-hydroxyphenyl) propionamide]; N,N'-bis(3,5-di-butyl-4-hydroxylephenylpropionyl) hydrazine; Tris(3,5-di-tert-butyl-4-hydroxybenzyl)isocyanurate; Benzenepropanoicacid, 3,5-bis(1,1-dimethylethyl)-4-hydroxy-(1,2-dioxo-1,2-ethanediyl)-bis(imino-2,1-ethanediyl) ester; or 2,6-di-tert-butyl-4-ethylphenol.

6. The core composition of claim 1, wherein the polymer is ethylene vinyl acetate and the lubricant is a fatty acid.

7. A metal panel composite comprising two outer metal layers and the core composition of claim 1 between said outer metal layers.

8. The metal panel composite of claim 7, wherein said metal layers comprise aluminum or an aluminum alloy.

9. The metal panel composite of claim 8, wherein said metal layers have an inner and outer surface, and wherein said inner surface has a coating of sodium silicate solution and wherein said sodium silicate solution is in contact with said core composition.

10. A process for producing a metal panel composite comprising extruding the core composition of claim 1, conveying said extruded core composition into a calender having two or more rollers carrying metal panels having an inner and outer surface, wherein the inner surface of the metal panels is brought into contact with the core composition, and wherein the rollers provide pressure on the outer surface of the metal panel to form the metal panel composite.

11. The process of claim 10, wherein said metal panels are made of aluminum or an aluminum alloy, and wherein said inner surface of the metal panels has a coating of sodium silicate solution.

12. The process of claim 10, wherein said extruding is performed by a twin screw extruder.

13. The process of claim 10, wherein the polymer is ethylene vinyl acetate and the lubricant is a fatty acid.

* * * * *